US010175383B2

(12) United States Patent
Skelt

(10) Patent No.: US 10,175,383 B2
(45) Date of Patent: Jan. 8, 2019

(54) SYSTEM AND METHOD FOR PERFORMING SIMULTANEOUS PETROPHYSICAL ANALYSIS OF COMPOSITION AND TEXTURE OF ROCK FORMATIONS

(71) Applicant: Chevron U.S.A. Inc., San Ramon, CA (US)

(72) Inventor: Christopher Hugh Skelt, Houston, TX (US)

(73) Assignee: Chevron U.S.A. Inc., San Ramon, CA (US)

(*) Notice: Subject to any disclaimer, the term of this patent is extended or adjusted under 35 U.S.C. 154(b) by 1010 days.

(21) Appl. No.: 14/010,811

(22) Filed: Aug. 27, 2013

(65) Prior Publication Data

US 2014/0074406 A1 Mar. 13, 2014

Related U.S. Application Data

(60) Provisional application No. 61/700,603, filed on Sep. 13, 2012.

(51) Int. Cl.
*G01V 11/00* (2006.01)
*G06F 17/12* (2006.01)
(Continued)

(52) U.S. Cl.
CPC .......... *G01V 11/002* (2013.01); *G01V 11/00* (2013.01); *G06F 17/12* (2013.01); *G01V 3/18* (2013.01); *G01V 9/00* (2013.01)

(58) Field of Classification Search
None
See application file for complete search history.

(56) References Cited

U.S. PATENT DOCUMENTS 3,500,683 A 3/1970 Hoyle
3,721,960 A * 3/1973 Eliahou ............... G01V 1/50
250/262

(Continued)

FOREIGN PATENT DOCUMENTS

| EP | 1368777 | 10/2007 |
|----|---------|---------|
| GB | 2013941 | 8/1979 |
| WO | 00/39612 A1 | 7/2000 |

OTHER PUBLICATIONS

Thomas E.C., and Stieber S.J., "The Distribution of Shale in Sandstones and its effect on Porosity," 1975, SPWLA 16th Annual Logging Symposium and its Effect on Porosity, Paper T.

(Continued)

*Primary Examiner* — Roy Y Yi
*Assistant Examiner* — Geoffrey T Evans
(74) *Attorney, Agent, or Firm* — Mary R. Bram; Melissa M. Hayworth; Marie L. Clapp

(57) ABSTRACT

A system and a computer implemented method for performing simultaneous petrophysical analysis for composition and texture of a rock formation. The method includes inputting a set of response equations for sand, shale and fluid that are present in the rock formation, wherein the shale comprises laminated shale, dispersed shale and structural shale; determining simultaneously a solution of the set of response equations, the solution describing composition and texture of the rock formation; and determining from the solution volume fractions for sand, shale and fluid and a texture of the shale including fractions of laminated shale, dispersed shale and structural shale.

26 Claims, 10 Drawing Sheets

(51) Int. Cl.
*G01V 3/18* (2006.01)
*G01V 9/00* (2006.01)

(56) References Cited

U.S. PATENT DOCUMENTS

| | | | | |
|---|---|---|---|---|
| 4,233,839 | A * | 11/1980 | Coates | E21B 49/00 250/256 |
| 4,369,497 | A * | 1/1983 | Poupon | G01V 11/00 324/338 |
| 4,495,604 | A | 1/1985 | Christian et al. | |
| 4,502,121 | A * | 2/1985 | Clavier | G01V 11/00 324/324 |
| 4,584,874 | A | 4/1986 | Ruhovets | |
| 4,617,825 | A * | 10/1986 | Ruhovets | E21B 49/00 250/256 |
| 4,756,189 | A | 7/1988 | Walter et al. | |
| 4,769,606 | A * | 9/1988 | Vinegar | G01V 3/24 250/256 |
| 4,817,062 | A * | 3/1989 | De Buyl | G01V 1/282 367/57 |
| 4,833,914 | A * | 5/1989 | Rasmus | E21B 21/08 175/50 |
| 4,949,575 | A * | 8/1990 | Rasmus | E21B 21/08 166/250.01 |
| 5,349,528 | A | 9/1994 | Ruhovets | |
| 6,052,649 | A | 4/2000 | Goldman et al. | |
| 6,470,274 | B1 * | 10/2002 | Mollison | G01V 3/28 702/12 |
| 6,493,632 | B1 | 12/2002 | Mollison et al. | |
| 6,686,736 | B2 | 2/2004 | Schoen et al. | |
| 6,833,699 | B2 * | 12/2004 | Galford | G01V 3/32 324/303 |
| 7,257,490 | B2 | 8/2007 | Georgi et al. | |
| 7,363,160 | B2 | 4/2008 | Seleznev et al. | |
| 7,424,367 | B2 | 9/2008 | Saltzer et al. | |
| 7,657,375 | B2 | 2/2010 | Wang et al. | |
| 7,747,552 | B2 | 6/2010 | Kairo et al. | |
| 8,548,783 | B2 * | 10/2013 | Dean | G01V 99/005 703/10 |
| 2002/0133323 | A1 * | 9/2002 | Dahlberg | G01V 3/38 703/10 |
| 2003/0105590 | A1 * | 6/2003 | Mollison | G01V 3/28 702/7 |
| 2004/0140801 | A1 | 7/2004 | Schoen et al. | |
| 2009/0184958 | A1 * | 7/2009 | Osypov | G01V 99/00 345/420 |
| 2009/0248309 | A1 | 10/2009 | Neville et al. | |
| 2009/0271118 | A1 * | 10/2009 | Saltzer | G01V 1/306 702/14 |
| 2010/0175886 | A1 | 7/2010 | Bohacs et al. | |
| 2011/0054795 | A1 * | 3/2011 | Klein | G01V 3/32 702/7 |
| 2011/0144913 | A1 * | 6/2011 | Klein | G01V 3/20 702/13 |
| 2011/0208431 | A1 | 8/2011 | Skelt | |
| 2012/0158378 | A1 * | 6/2012 | Enchery | E21B 43/00 703/2 |
| 2015/0094999 | A1 * | 4/2015 | VanderHeyden | E21B 41/00 703/2 |
| 2017/0212275 | A1 * | 7/2017 | Skelt | G01V 99/005 |
| 2017/0254924 | A1 * | 9/2017 | Nikitenko | G01V 11/002 |

OTHER PUBLICATIONS

Ellis D., et al., "Mineral Logging Parameters," The Technical Review, Schlumberger, vol. 36, No. 1, pp. 38-53.

Popta et al. An Advanced Evaluation Method for Laminated Shaly Sands Including Uncertainty and Sensitivity Popta et al. Dec. 2004.

Mavko et al. Investigating Thomas-Stieber Model for Property Estimation of Thin-bedded Shaly-sand Reservoirs Mavko et al. 2009.

A. Poupon et al: 11 Log Analysis of Sand-Shale SequencesA Systematic Approach Journal of Petroleum Technology vol. 22. No. 7. Jul. 1, 1970 (Jul. 1, 1970) pp. 867-881.

Miguel Saldana et al: An Algorithm for the Analysis of Shaly Gas Sands SPE California Regional Meeting. Mar. 25-27, 1981. Bakersfield. California. Mar. 25, 1981 (Mar. 25, 1981). pp. 335-346.

A. M.K. Basal: 11 Analytical Treatment of Neutron-Density Crossplot for Shaly Sand Reservoirs Journal of King Abdulaziz University—Earth Sciences. Oct. 1, 1998 (Oct. 1, 1998). pp. 115-142.

A Mezzatesta et al: 11A Novel Approach to Numerical Integration of Conventional. Multi-Component Induction. and Magnetic Resonance Data in Thinly Bedded Sand-Shale Systems 6th International Conference & Exposition on Petroleum Geophysics 11 Kolkata 2006 Jan. 11, 2006 (Jan. 11, 2006). pp. 763-767.

PCT International Preliminary Report on Patentability, International Application PCT/US2013/056781 dated Mar. 17, 2015.

PCT International Search Report and Written Opinion, International Application PCT/US2013/056781 dated Dec. 17, 2013.

* cited by examiner

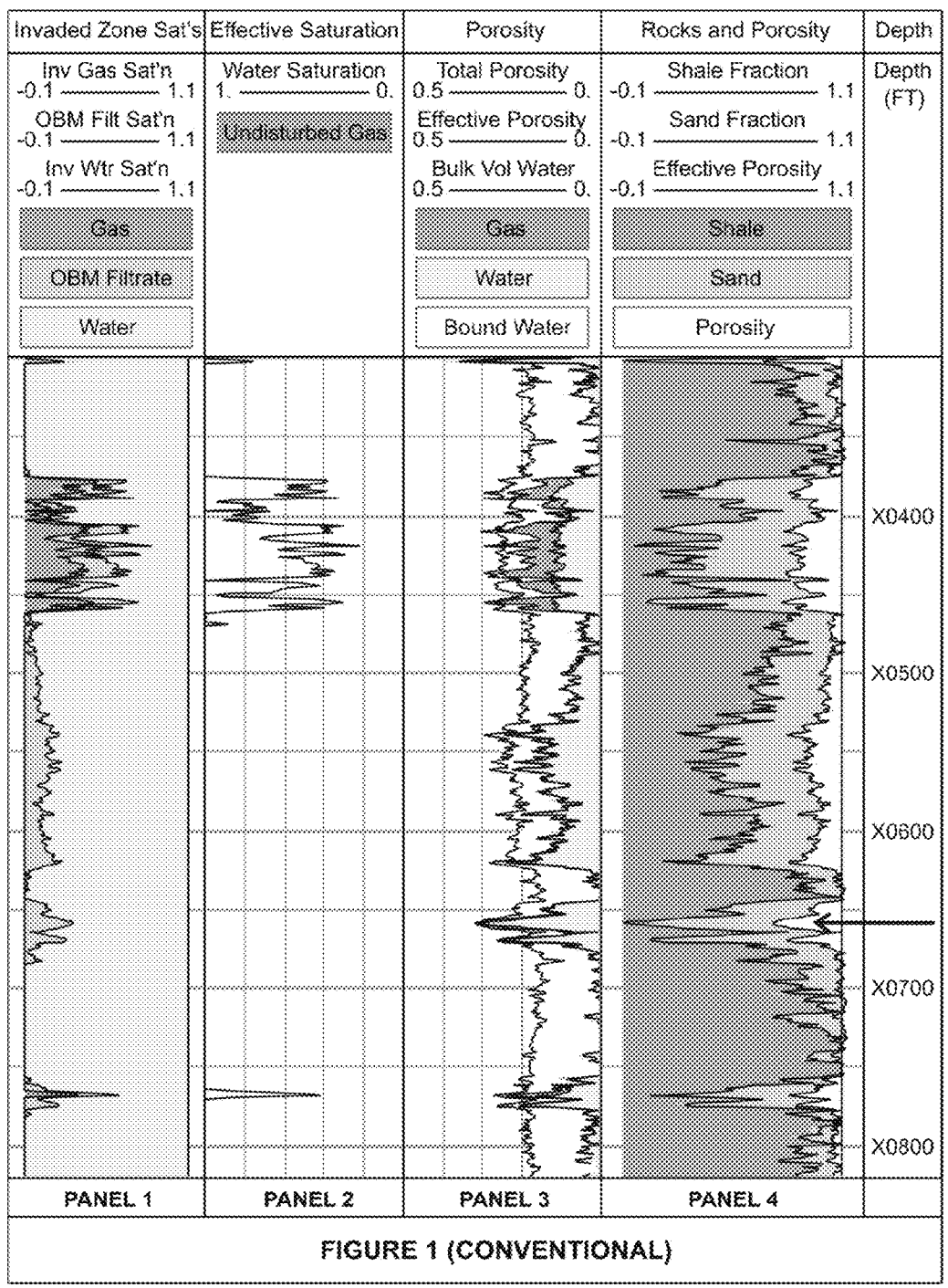
FIGURE 1 (CONVENTIONAL)

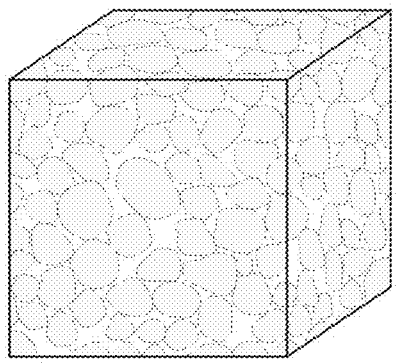
Clean sandstone
FIGURE 2A (BACKGROUND)
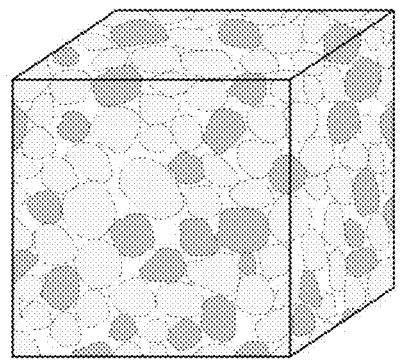
Sandstone with structural Shale
FIGURE 2B (BACKGROUND)
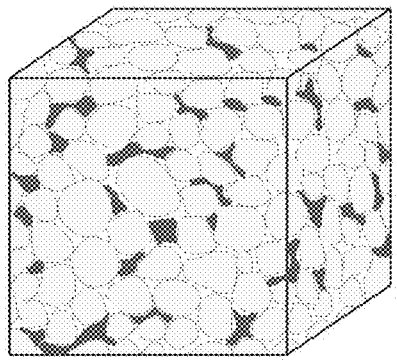
Sandstone with dispersed shale
FIGURE 2C (BACKGROUND)
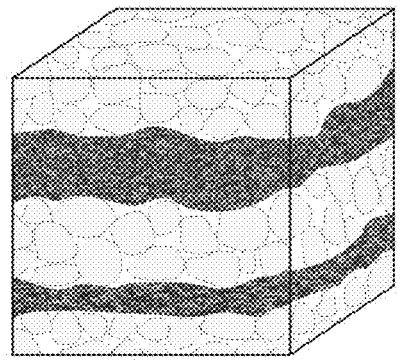
Laminated sand and shale
FIGURE 2D (BACKGROUND)

SYSTEM AND METHOD FOR PERFORMING SIMULTANEOUS PETROPHYSICAL ANALYSIS OF COMPOSITION AND TEXTURE OF ROCK FORMATIONS

FIELD

The present invention pertains in general to a system and method for analyzing rock formations, and in particular a system and computer-implemented method for simultaneously analyzing composition and texture of a subsurface rock formation.

BACKGROUND

Log and core data are routinely used by petrophysicists to analyze the lithology, porosity and saturation of oil and gas reservoirs. Log and core data can deliver results in the form of volume fractions of lithological or mineralogical components, porosity, and relative fractions of fluids present in a rock formation. However, this volumetric and compositional analysis does not address the geometric distribution of the mineralogical components.

FIG. 1 depicts various graphs showing a conventional petrophysical analysis solving for sand, shale, porosity and fluid saturations. The data plotted in FIG. 1 is derived from a simple logging suite includes resistivity, gamma ray, density and thermal neutron logs. The plotted results are volume fractions of sand and shale plotted versus depth, in the fourth panel (PANEL4) of FIG. 1, oil-based mud (OBM) filtrate saturation plotted versus depth, in the first panel (PANEL1) of FIG. 1, connate water and gas saturation in the invaded zone plotted versus depth in the first panel (PANEL1) of FIG. 1, and undisturbed zone gas saturation plotted versus depth in the second panel (PANEL2) of FIG. 1. The response equations of the four individual logs in the logging suite, plus the implied "unity" equation that specifies that the rock and fluid fractions sum to one, relate to the rocks and invaded zone fluids, so that up to five rock and fluid components may be quantified. Programs such as Schlumberger's ELAN that deliver a result by solving a determined or over-determined set of response equations are frequently used for this task. Total porosity plotted versus depth in the third panel (PANEL3) of FIG. 1 represents all the fluids present in the formation while effective porosity takes into account pore space where pores and pore throats are sufficiently large to allow fluid flow, hydrocarbon emplacement and production. As it can be appreciated, the term "saturation" is used for relative fractions of fluid within the porosity. The terms "volume, fraction or volume fractions" relate components to the whole formation, i.e., rocks plus fluids.

FIG. 2A-2D depicts a schematic conventional representation of clean sandstone and sandstone modified by the presence of structural, dispersed or laminated shale. In a clean sandstone, discrete sand grains make up a rigid pack and thus form pores therebetween, as depicted in FIG. 2A. In sandstone modified by the presence of shale, as in the case in many clastic reservoir sequences, the sandstone modified by the presence of shale may include intervals of thinly laminated sand and shale formations, as shown in FIG. 2D, and "shaley sand" intervals with evenly distributed shale within the pore space formed by the sand pack, as shown in FIG. 2C. However, in the case of "shaley-sand," the shale may also be present as structural grain or "clasts" or forming part of the grain pack alongside the sand grains, as shown in FIG. 2B.

The conventional results plotted in FIG. 1 provide only information as to the overall proportion of sand and shale but do not provide any indication of the distribution of shale within the sand because the logs listed are sensitive only to the bulk volume fractions of the rocks, not their textural distribution. We refer to this as a "compositional analysis."

It is assumed that variations in formation properties occur at a fine vertical scale, so the logs respond to the formation properties averaged over their vertical resolution which is about two feet for many common logs. The resolution is defined by the equipment or apparatus or measurement system (such as gamma ray Compton scattering or the slowing down length of high energy neutrons) used in the logs.

As can be seen, in FIGS. 2B-2D, three types of distribution of clay or shale within sandstone may be considered. The clay distribution has a significant effect on the petrophysical properties of the formation. Structural shale clasts, shown in FIG. 2B, replace sand grains leaving porosity and permeability essentially unchanged. Dispersed shale, or equally authigenic clay, shown in FIG. 2C fills the pore space, so a relatively small quantity reduces the pore space resulting in a significant drop in permeability, pore size and hydrocarbon volume fraction. In the laminated sequence, shown in FIG. 2D, the inherent properties of the sandy part of the rock are unchanged. Vertical permeability is zero, while horizontal permeability of the unit cube of formation is the same as for the clean sandstone, multiplied by the sand fraction. Similarly, in the laminated sequence, the effective porosity is equal to clean sand porosity multiplied the sand fraction.

These observations lead to plots or constructions such as that of Thomas and Stieber (TS) (see, Thomas E. C., and Stieber S. J., "The Distribution of Shale in Sandstones and its effect on Porosity," 1975, SPWLA 16th Annual Logging Symposium and its Effect on Porosity, Paper T.). FIG. 3 depicts an example of a TS construction plotted in effective porosity format that uses the relationship between porosity and shale fraction to imply shale distribution. The y-axis represents the effective porosity and the x-axis represents the total shale fraction. The total shale fraction is the volume of shale divided by the total volume (the total volume being equal to the sum of the volume of the sand, the volume of the pores and the volume of the shale). This type of construction is referred herein as a "textural" analysis. As it can be appreciated, understanding the rock texture complements and adds value to the compositional analysis.

Computed porosity and shale fraction pairs from results of a computation such as that shown on FIG. 1 are plotted on a grid, such as the TS grid shown in FIG. 3. FIG. 3 illustrates an example for a formation with a clean sand porosity (on the y-axis) of 0.3, indicated as point M on FIG. 3. A porosity of zero represents a structure having substantially all shale, i.e., the total shale fraction (on the x-axis) is equal to 1.0 or 100%. A point with porosity equal to zero and a total shale fraction equal to 1.0 is indicated as point Z on FIG. 3. Points lying on the dotted line "L" from the "clean sand" maximum porosity point "M" to the zero porosity, 100% shale point "Z" represent laminated formations where the clean sand porosity is preserved in the sand laminations. The laminated shale fraction increases linearly along line "L".

The solid lines forming nested recumbent chevron "V" patterns are lines of constant laminated shale fraction. Point "D" is the point where all the pore space is filled with dispersed shale. At point "D", the dispersed shale fraction is 0.3 (30%) and the effective porosity is zero (the presence of shale in the pore space reduces the porosity to zero). The dispersed shale fraction at point "D" is equal to the maximum porosity at point "M" (i.e., 0.3). Structural shale, depicted in FIG. 2B, is assumed to replace sand grains without changing porosity since the structural shale simply replaces some grains of sand in the sandstone while the pores within the sandstone are left unchanged. The maximum theoretical structural shale porosity is therefore represented by point "S" where all sand grains have been replaced by structural shale. The x-axis value of point "S" is equal to one minus the porosity at point "M." Lines of constant dispersed and structural shale lie parallel to line "L".

A number of specific assumptions and limitations underlie the TS construction:

(a) a first assumption is that clean sand laminations maintain the same porosity, irrespective of the sand to laminated shale context. However, counterevidence from cores indicates that as the sand-shale ratio reduces, the sands become finer grained, less well sorted, and have lower porosity than thicker sand laminations;

(b) a second assumption is that the three shale types (i.e., structural shale, dispersed shale and laminated shale) have the same properties. However, considering the depositional conditions of (for example) a deep water turbidite sequence, the structural shale clasts are deposited under high energy conditions concurrently with the sand grains while the shale laminations are deposited during more quiescent periods. Material considered as dispersed shale may be authigenic clay minerals with quite distinct properties from the shale that contains clay minerals and other fine grained clastic material. Technology for quantifying several clay types exists, but requires more than the limited logging suite in this example, and in any case a more complete mineralogical interpretation could not be fed into the Thomas-Stieber (TS) construction in its conventional format.

(c) a first limitation is that the TS construction does not account for the possibility that structural and dispersed shale co-exist. For example, points lying on the laminated sand line "L" could equally have a wide range of balanced fractions of dispersed shale and structural shale.

Core descriptions and image logs can offer alternative independent estimates of laminated sand and shale fraction. The core descriptions and image logs are often considered quite reliable. However, in general, they differ from the results from the TS construction, and cannot easily be reconciled.

Despite these identifiable shortcomings, the TS construction is still commonly used in a sequential workflow where the textural analysis follows the compositional analysis. Therefore, there is a need for a method or methods that address these and other deficiencies in the conventional methods.

SUMMARY

An aspect of the present invention is to provide a computer implemented method for performing simultaneous petrophysical analysis for composition and texture of a rock formation. The method includes inputting, into the computer, a set of response equations for sand, shale and fluid that are present in the rock formation, wherein the shale includes laminated shale, dispersed shale and structural shale; determining, by the computer, simultaneously a solution of the set of response equations, the solution describing composition and texture of the rock formation; and determining, by the computer, from the solution composition volume fractions for sand, shale and fluid and a texture of the shale including fractions of laminated shale, dispersed shale and structural shale.

Another aspect of the present invention is to provide a computer system for performing simultaneous petrophysical analysis for composition and texture of a rock formation. The computer system includes a memory configured to store a set of response equations for sand, shale and fluid that are present in the rock formation, wherein the shale includes laminated shale, dispersed shale and structural shale. The computer system also includes a processor configured to determine simultaneously a solution of the set of response equations, the solution describing composition and texture of the rock formation; wherein the solution includes compositional volume fractions for sand, shale and fluid and a texture of the shale including fractions of laminated shale, dispersed shale and structural shale.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

In the accompanying drawings:

FIG. 1 depicts various graphs showing a conventional compositional petrophysical analysis solving for sand, shale porosity and fluid saturations;

FIG. 2A-2D depicts a schematic conventional representation of clean sandstone and sandstone modified by the presence of structural, dispersed or laminated shale;

DETAILED DESCRIPTION

In one embodiment, a method for simultaneous petrophysical analysis of clastic reservoir sequences for composition and texture is provided. The clastic reservoir sequences are often referred to as "shaley sands." Oil or gas may also be present in porous, permeable formations separated by non-reservoir intervals or "shales" and the reservoir sequences of interest, that are referred to as "sand," may additionally include sporadic coaly or carbonate rich beds. The term "sand" should be interpreted as having predominantly quartz material with additional minerals such as feldspars, carbonates, and other impurities.

The method includes determining a simultaneous solution of a set of wireline log response equations for sand and shale and fluids, with the shale subdivided into the three classes (laminated, dispersed and structural) according to the classic TS construction. The method enables petrophysical interpretation of clastic reservoirs by simultaneously addressing the volumetric composition and textural consideration. The method delivers a result that is more comprehensive and consistent with more data than can be achieved using the sequential workflows currently practiced.

By performing the compositional and textural analyses in a single step, this provides ways of overcoming the prior art limitations, and achieving a more comprehensive self-consistent petrophysical interpretation. Even the simplest implementation, embedding the classic Thomas-Stieber (TS) construction within a compositional analysis, offers user productivity improvements compared with a sequential workflow.

The response equation based log interpretation platform permits more sophisticated analyses that overcome the sometimes unrealistic basis for the TS construction. Furthermore, in additional embodiments, distinct properties can be assigned to the different shale types without the need for further logs. The analysis can be supplemented by using externally derived laminated shale fraction and core derived relations linking sand lamination porosity to sand-shale lamination ratio, and can accommodate the coexistence of structural and dispersed shale.

The gamma ray log response is modeled as representing an average of two endpoint rocks, one of which is shale, the properties of which are known. For the purposes of illustration, the gamma ray log is used as a shale indicator. However, as it can be appreciated, other types of logs can also be used including thermal neutron logs, density logs, and resistivity logs. In accordance with standard practice, shale-free sands and massive shale intervals are identified on the logs. The gamma ray readings are noted, often referred to as sand and shale "picks," and the range between these picks rescaled as a gamma ray index ranging from zero in sands to one in shales.

Figure 3:
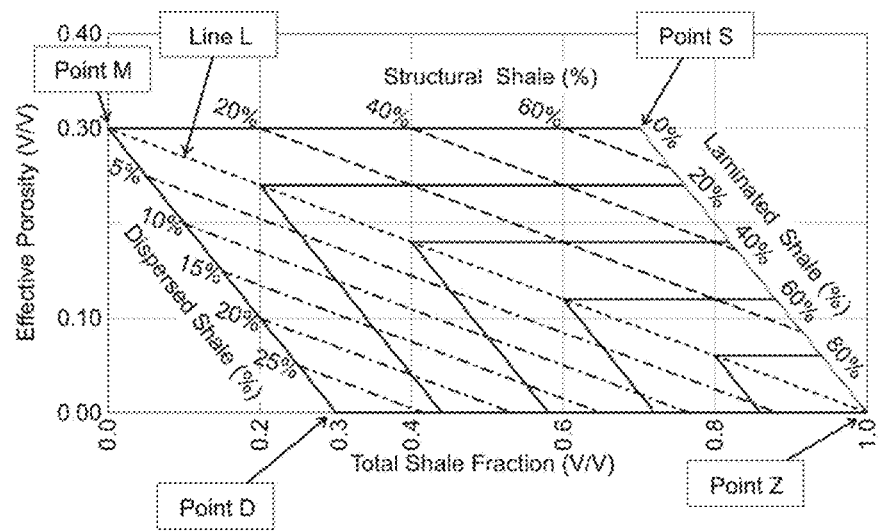
FIG. 3 provides the framework presented in the effective porosity domain, with an effective porosity of laminated shale (at 100%) equal to zero.

FIG. 3 provides a framework presented in the effective porosity domain, with an effective porosity of laminated shale (at 100%) equal to zero. Replacement of sand grains with structural shale does not alter the effective porosity of the whole rock and thus the "S" point of the parallelogram represents a rock having structural shale grains with porosity equal to that of clean sands. Point "D" of the parallelogram represents a sandy rock with the pores space totally occluded with a dispersed shale fraction equal to the clean sand porosity.

The straight line "L" joining the clean sand point "M" with maximum porosity $\phi_{Max}$ (e.g., equal to 0.3 in the example shown in FIG. 3) and shale point "Z" corresponds to formations formed of shale only. The maximum porosity or $\phi_{Max}$ is the typical porosity determined by the compositional analysis in intervals where the shale fraction is interpreted as zero. It may be a representative value for a particular reservoir, or may be a function of depth to take account of compaction if large vertical intervals are being considered. In this non-limiting example, the maximum porosity is read from a measurement point where there is substantially no shale, indicated by an arrow on FIG. 1. For example, at the point indicated by the arrow, the porosity is determined to be equal to 0.3 which corresponds to the maximum porosity. The maximum porosity (e.g., 0.3) defines point M in the TS diagram and thus also allows to set points D and S in the TS diagram, hence defining the conformation of the diagram because point Z is positioned at (1, 0). Points lying on the line "L" are interpreted as mixtures of thin shale and sand laminations unresolved by the logs. A real life tendency for thinner sands to have lower porosity while remaining clay-free would manifest itself in some of the total computed shale fraction being assigned to dispersed-shale. Such a trend can be assessed by consideration of routine core porosity measurements in the context of the local net to gross ratio from the location where the logs were taken. In another non-limiting embodiment, the maximum porosity is a trend referenced to depth.

In an effective porosity system with zero effective porosity in the shales, the "laminated shale line" "L" is defined by the equation (1) below.

$$\phi_{Effective} = \phi_{Max} - V_{ShLam} \phi_{Max} \tag{1}$$

where $V_{ShLam}$ is the shale lamination fraction. The laminated shale fraction is defined by the relationship between effective porosity and maximum porosity. The TS construction states that points below the laminated shale line "L" include dispersed shale only, and points above the laminated shale line "L" include structural shale only.

Equation (1) can be rearranged as equation (2) to emphasize the link between effective porosity and shale lamination fraction.

$$\phi_{Effective} = \phi_{Max} - \phi_{Max} V_{ShLam} \tag{2}$$

Points lying below the line "L" have more total shale than the laminated shale fraction linked to effective porosity, and this excess shale is treated as dispersed within the sand laminations. By introducing total and dispersed shale, the maximum porosity can be expressed by the following equation (3).

$$\phi_{Max} = V_{ShLam} \phi_{Max} + V_{ShDisp} + \phi_{Effective} \tag{3}$$

Equation (3) lends itself to development into the form of a linear response equation. The example below is based on a simple sand-shale petrophysical model with oil based mud filtrate (OBMF) displacing invaded zone gas. Points that would lie to the left of the line from point "M" to point "D" are accommodated according to the relative uncertainties attached to the various input curves. In this case, the maximum porosity $\phi_{max}$ or PHIE_MAX can be expressed by the following equation (4). In the following equations, the sign "*" is used herein to indicate a multiplication operator. In addition, in the following equations, the notation "ShLam" is used for laminated shale. The notation "ShStruct" or "ShStr" is used for structural shale. The notation "ShDisp" is used for dispersed shale. The notation "XGas" is used for invaded zone gas. The notation "OBMF" is used for oil based mud filtrate that is, by definition, in the invaded zone. The notation "XWtr" is used for connate water in the invaded zone.

$$PHIE\_MAX = PHIE\_MAX * V_{ShLam} + 1 * V_{ShDisp} + 0 * V_{ShStruct} + 0 * V_{Sand} + 1 * V_{SGas} + 1 * V_{OBMF} + 1 * V_{XWtr} \quad (4)$$

The coefficients in equation (4) that multiply the volumes, such as for example coefficient "PHIE_MAX", are referred to herein as "response parameters." The response parameters may be real numbers or trend curves or a combination of both.

The shale in points lying above the line from point "M" to Point "D" is treated as a mixture of laminated and structural shale and these shale types are related through the expression (5).

$$V_{Shale} = V_{ShLam} + V_{ShStruct} \quad (5)$$

The sum of the three shale types (the laminated shale, the dispersed shale and the structural shale) is related via the gamma ray index (GR_INDEX) through the following equation (6). Note that in this simple example, the gamma ray index is synonymous with the bulk shale fraction determined in the compositional analysis.

$$GR\_INDEX = 1 * V_{ShLam} + 1 * V_{ShDisp} + 1 * V_{ShStr} + 0 * V_{Sand} + 0 * V_{XGas} + 0 * V_{OBMF} + 0 * V_{XWtr} \quad (6)$$

In combination with the gamma ray index (GR_INDEX) provided in equation (6), equation (7) below prevents the occurrence of dispersed shale (ShDisp) for points lying below the line "L" on FIG. 3.

$$1.0 = 1 * V_{ShLam} + 0 * V_{ShDisp} + 1 * V_{ShStr} + 1 * V_{Sand} + 1 * V_{XGas} + 1 * V_{OBMF} + 1 * V_{XWtr} \quad (7)$$

By preventing the occurrence of structural shale for points below the line "L", equation (7) removes the ambiguity whereby points may in theory include any amount of dispersed shale balanced by structural shale. A larger uncertainty is attached to equation (7) than to equation (6) such that structural shale is not prevented for points that are plotted above the line where equation (4) delivers zero dispersed shale.

Equations (4), (6) and (7), and three equations characterizing the responses of the density, neutron and shallow resistivity (which are similar to equation (6) above provided for the gamma ray index in that they define the log response in terms of contributions from the individual rock and fluid components of the model), and a further explicit equation whereby the fluid volumes and solid volumes sum to unity forms a set of seven equations. The latter equation is referred to as the "unity equation." The set of seven equations allows obtaining a solution for seven volume fractions which are: three shale types with individual textures (laminated shale, dispersed shale and structural shale), sand, mud filtrate, invaded zone connate water, and invaded zone hydrocarbon.

As it can be appreciated for the above paragraphs, the TS model or TS construction is combined or integrated with response equations conventionally used for petrophysical compositional analysis (porosity, saturation, etc.) to form a complete set of equations that allows obtaining solutions for volume fractions of interest including the simultaneous determination of composition and texture of structural shale, dispersed shale and laminated shale.

The conventional TS model or TS construction carries certain simplifications, for example porosity preservation within the sand laminations and identical properties for the laminated, dispersed and structural shale. Neither of these assumptions is intuitively correct and both can be proven wrong by detailed analysis of core data. Additionally, commercial TS applications do not generally accommodate complex mineralogy, coal beds or tight streaks.

The generalized interpretation framework of a response equation based application can overcome these limitations and make for a more physically coherent petrophysical model as the variables or unknown proportions of structural shale, dispersed shale and laminated shale (i.e., in composition and in texture) are included with the petrophysical equations. This provides more interaction of the textural variables (structural shale, dispersed shale, laminated shale, etc.) with the measurement itself using gamma ray, density, neutron and shallow resistivity, reflected in the petrophysical equations. Hence, different gamma ray values, different resistivity values, etc., can be assigned to different textural variables (structural shale, dispersed shale, laminated shale) to obtain a more accurate representation of the various facies (sand, structural shale, dispersed shale, laminated shale, etc.) within the earth.

The principles explained above can be developed for a non-limiting example of a laminated gas-bearing reservoir drilled with oil based mud (OBM). Specifically the following paragraphs describe an example where the classic TS logic is embedded real-world sequence of permeable reservoir quality sands, shales, and coaly and carbonate rich beds.

In rocks with predominantly simple sand-clay mineralogy such as those shown here, the bulk shale fraction may be derived by rescaling the gamma ray log between a low value representative of clay-free sand, and a high value corresponding to the massive shale intervals. The resulting shale fraction curve is scaled from zero to one, and is referred to as a "gamma ray index."

The petrophysical application solves a suite of petrophysical models addressing (for example) reservoir quality rocks, massive shale intervals, as well as coaly and carbonate-rich beds. The final result is generated by selecting the most appropriate model at each depth frame. In this example, the TS logic or TS diagram would not be implemented in the non-reservoir models designed to handle the shales, or the coaly and carbonate-rich beds, as the TS diagram is not intended to process coaly deposits or carbonate deposits which exist in shales. For example, TS logic would erroneously interpret structural shale in coaly intervals and erroneously interpret dispersed shale in tight carbonate beds.

Figure 4:
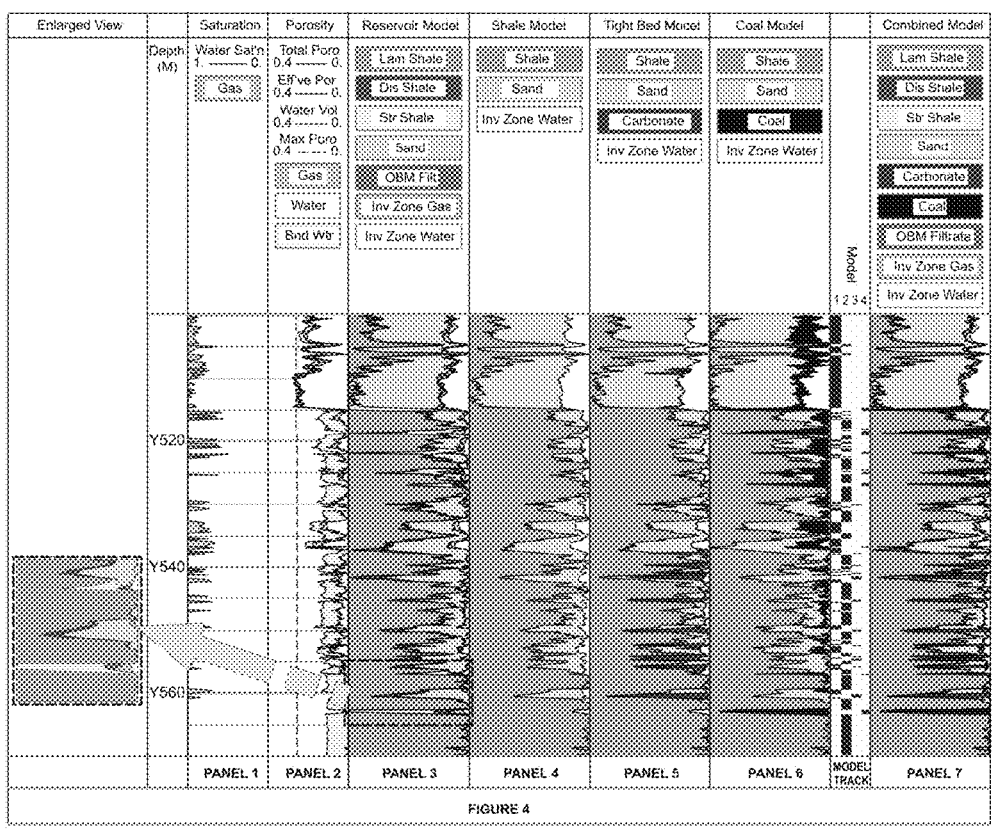
FIG. 4 depicts examples of results obtained using TS shale texture computation embedded in a petrophysical analysis, according an embodiment of the present invention.

FIG. 4 depicts examples of results obtained using TS shale texture computation embedded in a petrophysical analysis, according an embodiment of the present invention. The first panel (PANEL1) is a plot of water saturation versus depth. The second panel (PANEL2) depicts total porosity, effective porosity, water volume fraction, and maximum porosity versus depth. The third panel (PANEL3) is a reservoir model where laminated shale (Lam Shale), dispersed shale (Dis Shale), structural shale (Str Shale), sand, oil base mud filtrate (OBM filt), invaded zone gas (Inv. Zone Gas), and invaded zone water (Inv. Zone Wtr) are plotted versus depth. The fourth panel (PANEL4) is a shale model where shale, sand, and invaded zone water are plotted versus depth. In this case, shale is defined by its impermeability that prevents emplacement of gas and invasion of OBM filtrate. Because the shale model is not reservoir, the textural analysis has no value and the shale interpretation is limited to a bulk shale compositional analysis. The fifth panel (PANEL5) is tight bed model where shale, sand, carbonate, and invaded zone water are plotted versus depth. The sixth panel (PANEL6) is a coal model where shale, sand, coal, and invaded zone water are plotted versus depth. The shale model, the coaly and tight intervals are considered to be uninvaded and free of gas. Finally, the seventh panel (PANEL7) is a combined model where laminated shale (Lam Shale), dispersed shale (Dis Shale), structural shale (Str Shale), sand, oil base mud filtrate (OBM filtrate), invaded zone gas (Inv. Zone Gas), and invaded zone water (Inv. Zone Wtr), carbonate, coal are plotted versus depth.

This combined model is created by selecting one of the four individual models according to criteria that identify which of the four best characterizes the formation at each discrete depth. The right hand track labeled "Track Model" identifies the intervals over which each of the four models (reservoir model, shale model, coal model, tight bed model), numbered one to four, is selected. The enlarged view of PANEL 3 shows how the TS construction interprets a coal bed as having structural shale. This is rectified by logic to select the coal model in PANEL 6 in the combined model in PANEL 7.

Figure 5:
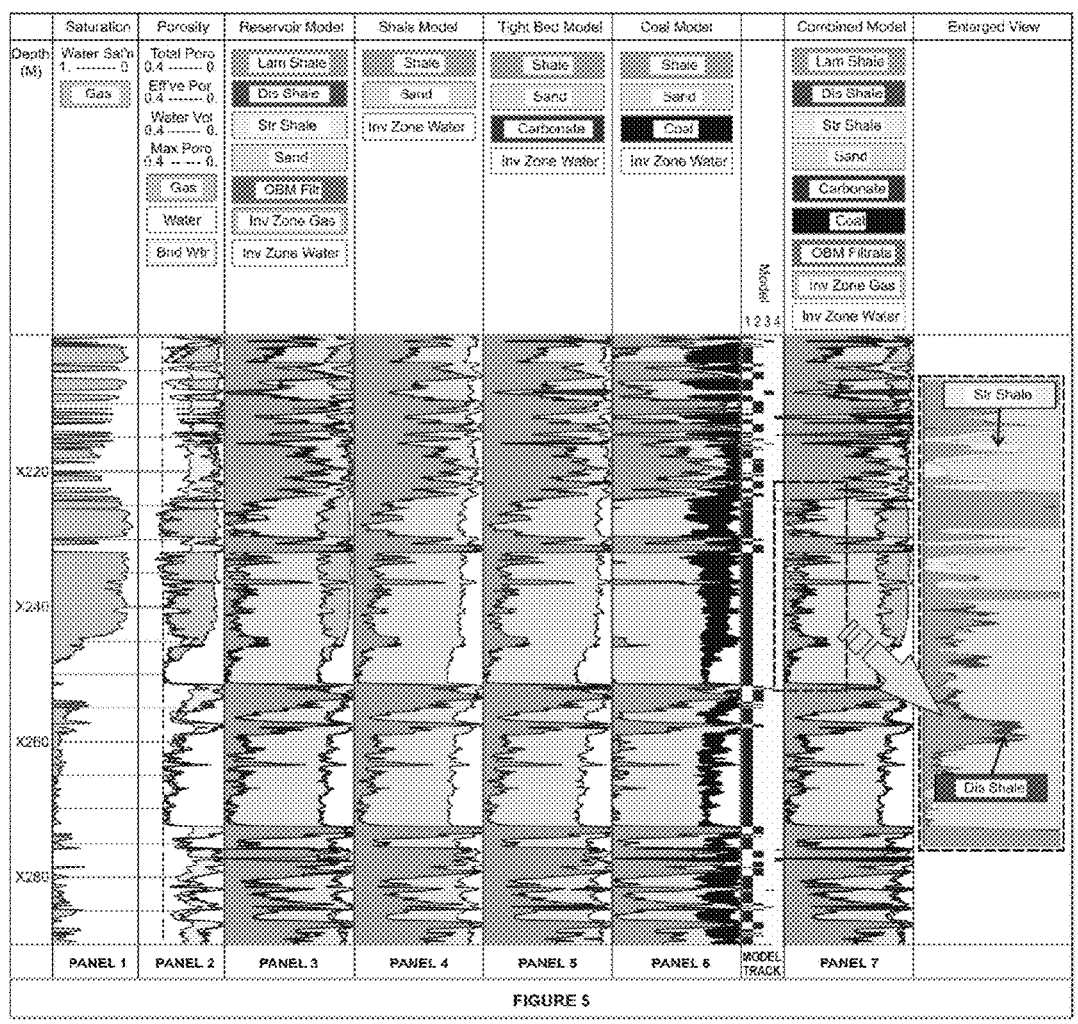
FIG. 5 depicts example interval with Thomas-Stieber (TS) shale texture computation embedded in the reservoir model, according to an embodiment of the present invention.

FIG. 5 depicts an additional example interval with Thomas-Stieber shale texture computation embedded in the reservoir model, according to an embodiment of the present invention. The computation method is identical to that of FIG. 4. Because FIG. 4 and FIG. 5 represent a significant vertical interval, the maximum porosity is a trend that reduces with depth to represent regional compaction. Each of the 4 models (reservoir model, shale model, tight bed model, coal model) addresses a distinct lithology found in a well. The formation properties in FIG. 5 differ from FIG. 4 in that the plotted depth range does not include tight or coaly intervals.

The presence of coal deposits and carbonate deposits render the problem more complex by introducing two additional unknowns (with a total of seven unknowns) in a set of limited number of equations (e.g., 5 equations). Therefore, additional input logs may be needed to solve the complete set of equations. However, knowing that the carbonate and coal form discrete uninvaded hydrocarbon-free beds enables these models to be defined with fewer fluids than are needed for the reservoir model. As can be seen from PANELS 4 and 5, these models contain four components only, and can therefore be solved using the original set of input logs, i.e., gamma ray, density, thermal neutron, shallow resistivity and the unity equation.

In reservoir intervals, this approach reproduces results from a sequential workflow where TS logic is applied after a compositional analysis. Elsewhere, this approach delivers a more appropriate analysis instead of (for example) interpreting coaly beds as high in structural shale, carbonate beds as high in dispersed shale, or shales as a rather meaningless combination of the three shale types. Because only one program is used for the compositional and textural analyses, this reduces cycle time and possibility for human error. In this case, the advantage over sequential workflows is principally operational.

In another embodiment, textural information expressed as a response equation is used to supplement the limited suite of wireline logs, enabling the solution for an additional volume. Consider the example where two rocks (sand and shale) and three fluids (connate water, gas and oil-based mud filtrate) are quantified by simultaneously solving the response equations of four logs responding to the invaded zone (shallow resistivity, gamma ray, density and thermal neutron) plus the unity equation. A determined set of five equations is solved at each depth frame for five volumes. If shale laminations are present between the sand laminations, while the sand laminations include authigenic dispersed clay mineral with different properties, the laminated model introduced above is not appropriate because the gamma ray index, an indicator of bulk shale fraction, does not quantify the laminated shale plus the dispersed clay. Equations (4), (6) and (7) are used as in the previous paragraphs to quantify laminated and dispersed clay. If the dispersed clay mineralogy is known, its density, neutron and gamma ray properties may be found in published references (e.g., "Log Interpretation Charts," Atlas Wireline Services, 1985, and Ellis D., et al., "Mineral Logging Parameters," The Technical Review, Schlumberger, Vol. 36, No. 1, pp. 38-53).

Figure 6:
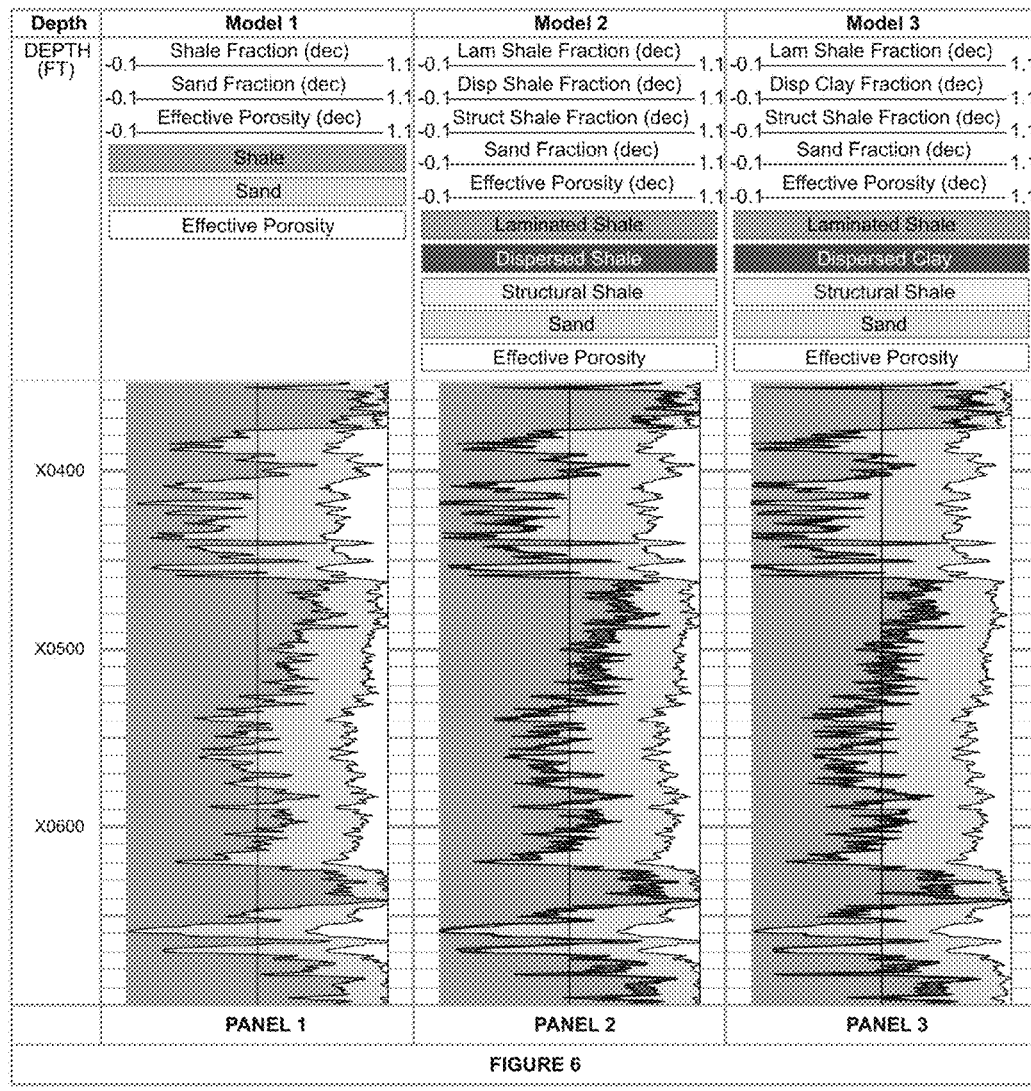
FIG. 6 shows a comparison between three models: a simple compositional analysis, a model which has the standard TS logic embedded in a compositional analysis, and a model with a TS logic embedded, but the dispersed clay has typical properties of a common clay mineral instead of the same properties as the laminated shale.

FIG. 6 shows a comparison between three models. Model 1 in PANEL 1 is the simple compositional analysis shown in FIG. 1. Model 2 in PANEL 2 has TS logic embedded with the same response parameters assigned to the laminated and dispersed shale. This is the approach used in the analysis that produced the results of FIGS. 4 and 5. Model 3 in PANEL 3 also has TS logic embedded, but the dispersed clay has typical properties of illite, a common clay mineral. Structural shale was included in models 2 and 3 for completeness. However, the computed structural shale fraction was zero throughout as all the data points lay below the "L" line of FIG. 3.

The total shale fraction (which is the sum of laminated shale, dispersed shale and structural shale) of Model 2 is more than the total shale plus clay of Model 3. This is due to a higher gamma ray value that is assigned to the dispersed clay of Model 3 than the dispersed shale of Model 2. Clay typically makes up about half the total volume fraction of shale and is the source of the majority of the natural radioactivity of shale.

The preceding example shows that results depend on the assumptions made about the chemistry of the dispersed material—treating it as clay material instead of assuming consistently with the TS tradition that it has the same properties as the laminated shale reduced the computed laminated shale fraction. In this case, it has the effect of increasing the interpreted thickness of productive sand laminations, and important aspect of reservoir characterization.

In the following paragraphs, an example is provided where an independently derived laminated shale index is used as an additional input. In the preceding examples, shale fraction was derived by reference to the gamma ray log readings in the massive shales above and below the sand fraction of interest. The implicit assumption that the massive shale represents the properties of the shale present in small quantities in the sand packages is common practice in shaley sand log analysis, but may be erroneous. In particular, in deep water turbidite sand packages the shale laminations are frequently found to be denser and less clay-rich than the massive hemipelagic shales separating them. A laminated shale fraction may be determined from analysis of image logs or inspection of whole core, or a conventional inversion of data tri-axial induction logs, or any combination thereof.

Figure 7:
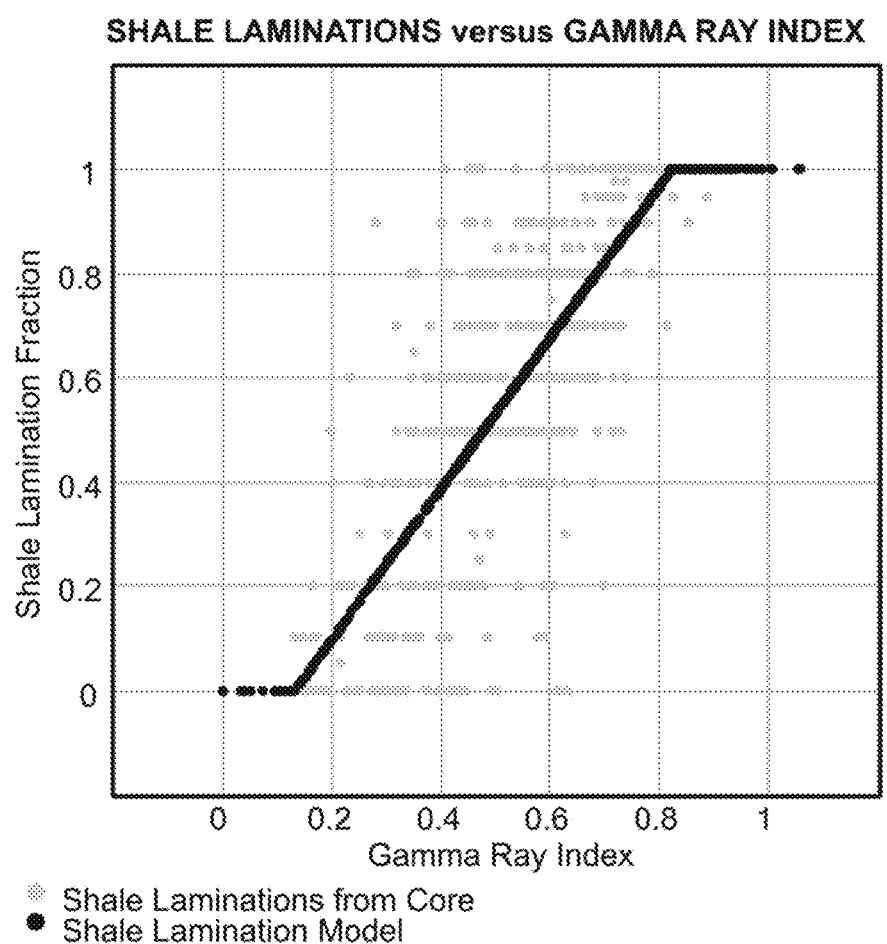
FIG. 7 is a graph of shale lamination fraction as a function of the gamma ray index plotted for shale lamination visually interpreted from a core (gray dots in the graph) and shale lamination from a model (black dots in the graph), according to an embodiment of the present invention.

FIG. 7 is a graph of shale lamination fraction derived from inspection of whole core versus log derived gamma ray index. The gray points represent individual records of the shale lamination fraction of six inch intervals of core, while the black dots represent a simple model used to estimate the core derived shale lamination fraction from the gamma ray index, according to an embodiment of the present invention.

FIG. 7 shows that intervals with gamma ray index less than 0.15 are free of laminations so any radioactivity comes from dispersed or structural shale. Sand laminations are absent from intervals with gamma ray index above 0.82. It is noted, however, that sand laminations have a lower level of natural radioactivity than the massive shales. These intervals are generally harder than the massive shales and are known as "hard shales."

Figure 8:
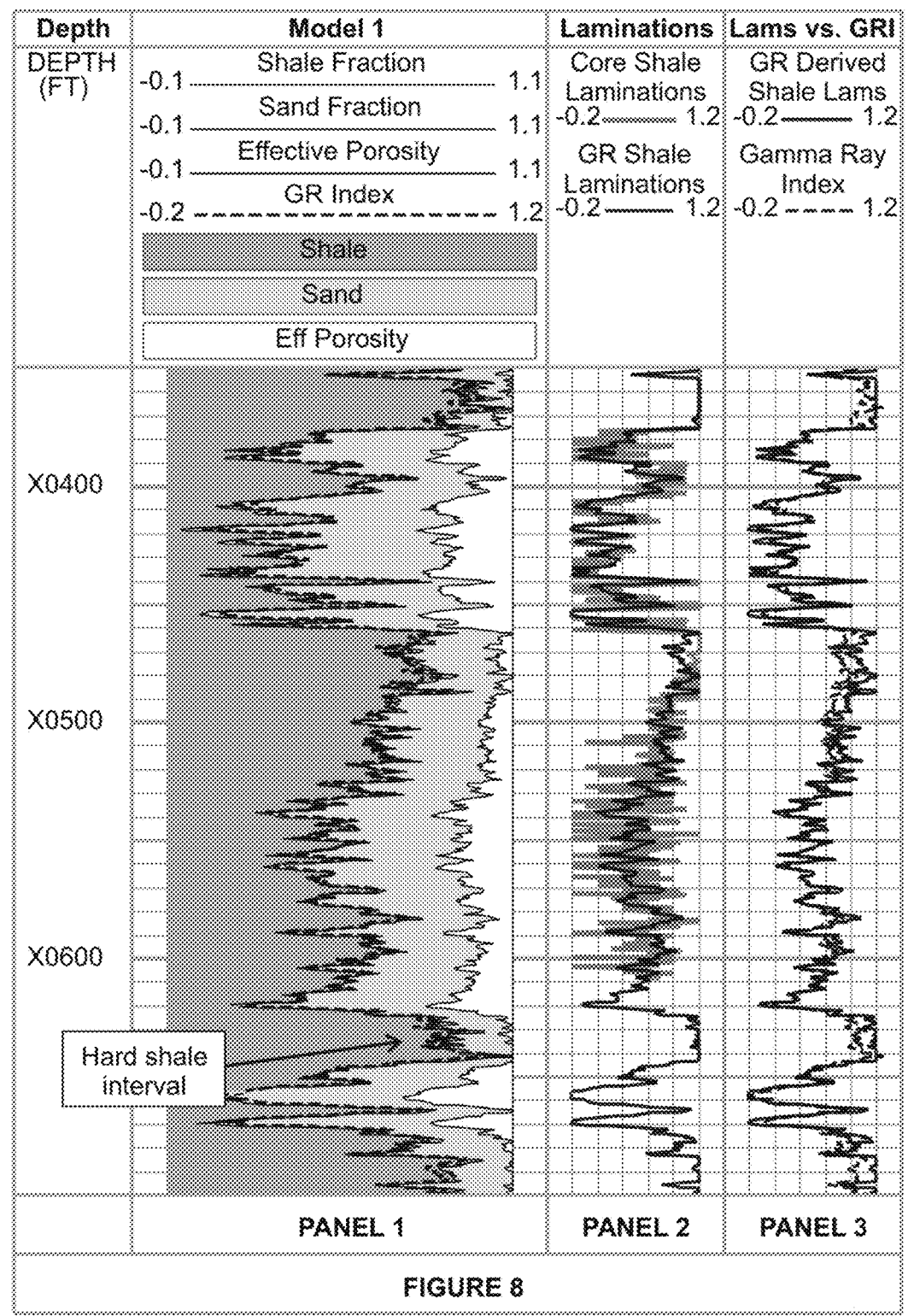
FIG. 8 depicts Model 1, a simple compositional analysis where the shale fraction, sand fraction, effective porosity, gamma ray (GR) index are plotted as a function of depth on a first panel (PANEL1), and comparisons between shale fraction from compositional analysis, core and log derived estimates of shale lamination fractions (PANELS 2 and 3), according to an embodiment of the present invention.

FIG. 8 depicts Model 1 based on a simple compositional analysis where the shale fraction, sand fraction, effective porosity, gamma ray (GR) index are plotted as a function of depth on a first panel (PANEL1), according to an embodiment of the present invention. This is the same interpretation as previously provided with respect to FIG. 1. Also plotted, on a second panel (PANEL2), are the core shale lamination fraction and the shale lamination fraction estimated from the gamma ray index using the model of FIG. 7. On a third panel (PANEL3), the gamma ray derived shale lamination fraction and the gamma ray index are compared. This track emphasizes the larger dynamic range of the shale lamination fraction that ranges from zero to one as the gamma ray index varies from 0.15 to 0.82.

In FIG. 8, Model 1 (PANEL1) shows the simple compositional analysis with the gamma ray index overlaying the shale fraction result. The core and gamma ray derived shale lamination fractions are shown on the Laminations track (PANEL2). These are the data points plotted gray and black respectively on FIG. 7. The core shale lamination fraction has a vertical resolution of six inches and shows the bedding in more detail than the gamma ray log, emphasizing the need, in the absence of wireline logs that fully resolve these beds of less than a few inches thick, for a laminated petrophysical model that does not require that the wireline logs fully resolve the beds.

Figure 9:
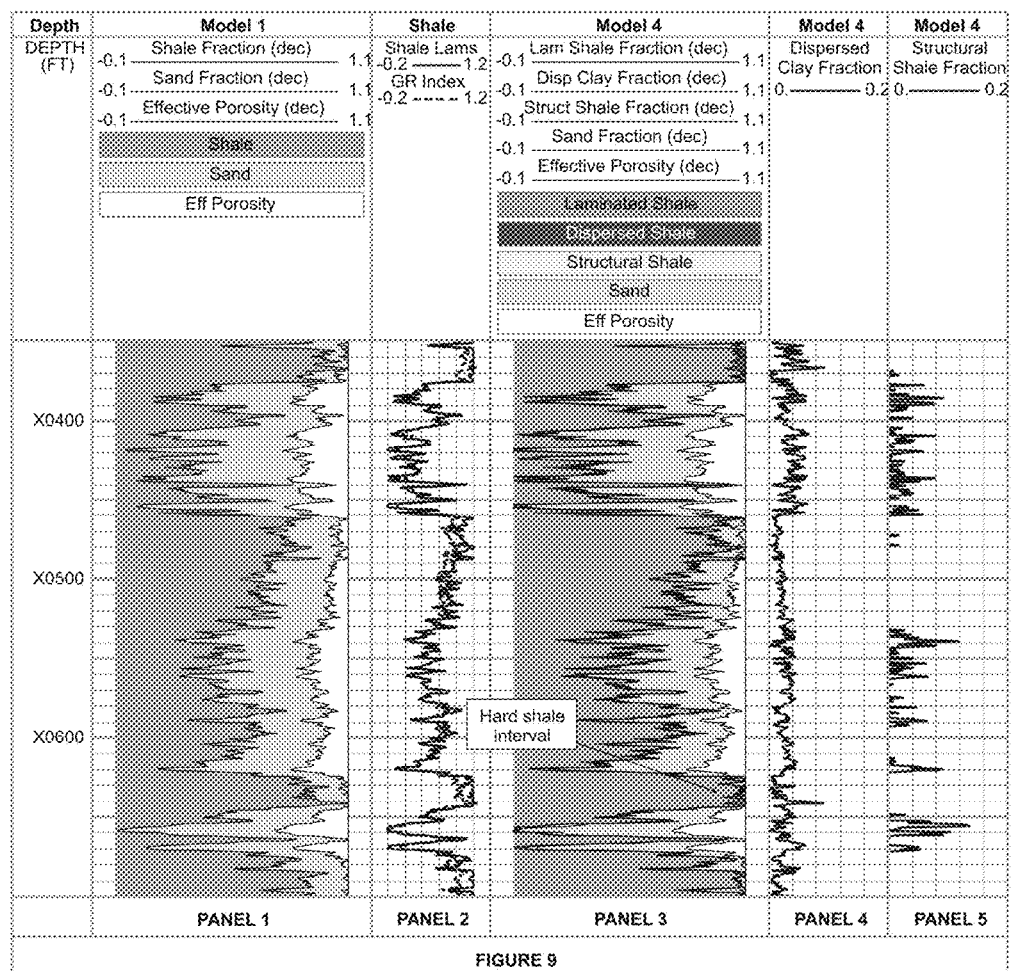
FIG. 9 depicts results of using the bulk shale fraction from compositional analysis the shale lamination fraction determined from core (PANEL 2) in combination with the TS logic for separating the shale types, according to an embodiment of the present invention.

In the previous models, shale lamination fraction was part of the computed result. In this example, a shale lamination fraction computed as described was used as an input to the simultaneous textural and compositional analysis. This model is identified as Model 4. FIG. 9 depicts results of using the shale lamination fraction obtained using the model of FIG. 7 in combination with the TS logic for separating the shale types, according to an embodiment of the present invention. On PANEL1 of FIG. 9 are plotted the shale fraction, the sand fraction, and the effective porosity versus depth according to Model 1 which is a simple compositional analysis. On PANEL2 of FIG. 9 are plotted the shale laminations and the gamma ray index as a function of depth, identical to PANEL2 of FIG. 8 On PANEL3 of FIG. 9 are plotted the laminated shale fraction, the structural shale fraction, the dispersed shale fraction (dispersed clay fraction), the sand fraction, and the effective porosity, as a function of depth, according to Model 4 which is based on a combined compositional and textural analysis using the externally derived shale lamination fraction as an input curve. On PANEL4 of FIG. 9 is plotted the dispersed clay or shale fraction versus depth. On PANEL 5 of FIG. 9 is plotted the structural shale fraction versus depth. PANELS 4 and 5 are provided for clarity to display the same dispersed and structural shale fractions shown on PANEL 3 as overall relative fraction of structural shale and dispersed clay is relatively small. In this example, dispersed clay is assigned illite properties as for Model 3, and the structural shale is assumed to have the same properties as the laminated shale.

As described in the previous paragraphs, the model solves for seven unknowns, so seven equations are needed. In addition to the five equations used in Model 1 compositional analysis, an additional equation linking the shale lamination fraction to the "GR Shale Laminations" (the curve in FIG. 7). The response equation for the gamma ray derived shale lamination fraction SHLAM_GRI, identified as "GR Derived Shale Lams" on PANELS 2 and 3 of FIG. 8 and "Shale Lams" on PANEL 2 of FIG. 9, can be expressed as follows.

$$SHLAM\_GRI = 1*VShLam + 0*VShDisp + 0*VShStr + 0*VSand + 0*VXGas + 0*VOBMF + 0*VXWtr \quad (8)$$

The addition of equation (8) brings the total number of equations to eight, resulting in an over-determined set, the solution to which is determined by the relative uncertainties attached to the individual equations, a situation that may lead to unpredictable results. In one embodiment, deleting equation (7) used to prevent the simultaneous occurrence of dispersed and structural shale in accordance with the original TS logic from the set returns the situation to determined, and permits the program to simultaneously evaluate quantities of dispersed and structural clay if the input data indicate that they coexist.

It should be noted that if there is information substantiating mineralogical differences between the structural, dispersed and laminated material, distinct response parameters can be assigned for all the wireline log response equations. As described previously, clay such as illite is more radioactive than typical shale, but also has specific responses for density, neutron, resistivity and other logs that differ from those of typical shale. Similar reasoning applies to structural and laminated shale. Those skilled in the art are familiar with methods such as reference to published literature and the construction of specific crossplots designed to illustrate property trends.

The option to use an externally derived shale lamination fraction enables the petrophysicist to use additional data, for example shale lamination fractions from core or image log analysis, both of which are considered to be reliable indicators. This overcomes a limitation of the classic Thomas-Stieber construction, that only one of dispersed and structural shale may be present. It also permits solving for three clay or shale types, each of which may have different properties, and thereby adds significant flexibility to the analysis. Specifically, by using an externally derived shale lamination fraction in conjunction with the underlying assumptions of the TS analysis that dispersed clay or shale fills the pores while structural shale replaces sand gains without altering porosity, the component of the shale not accounted for by the shale lamination fraction is partitioned between the dispersed and structural designations.

In one embodiment, the method or methods described above can be implemented as a series of instructions which can be executed by a computer. As it can be appreciated, the term "computer" is used herein to encompass any type of computing system or device including a personal computer (e.g., a desktop computer, a laptop computer, or any other handheld computing device), or a mainframe computer (e.g., an IBM mainframe), or a supercomputer (e.g., a CRAY computer), or a plurality of networked computers in a distributed computing environment.

For example, the method(s) may be implemented as a software program application which can be stored in a computer readable medium such as hard disks, CDROMs, optical disks, DVDs, magnetic optical disks, RAMs, EPROMs, EEPROMs, magnetic or optical cards, flash cards (e.g., a USB flash card), PCMCIA memory cards, smart cards, or other media.

Alternatively, a portion or the whole software program product can be downloaded from a remote computer or server via a network such as the internet, an ATM network, a wide area network (WAN) or a local area network.

Alternatively, instead or in addition to implementing the method as computer program product(s) (e.g., as software products) embodied in a computer, the method can be implemented as hardware in which for example an application specific integrated circuit (ASIC) can be designed to implement the method.

Figure 10:
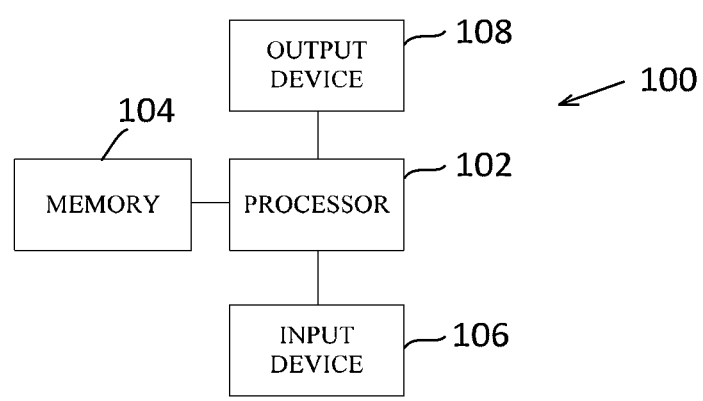
FIG. 10 is a schematic diagram representing a computer system 100 for implementing the method, according to an embodiment of the present invention.

FIG. 10 is a schematic diagram representing a computer system 100 for implementing the method, according to an embodiment of the present invention. As shown in FIG. 10, computer system 100 includes a processor (e.g., one or more processors) 102 and a memory 104 in communication with the processor 102. The computer system 100 may further include an input device 106 for inputting data (such as keyboard, a mouse or the like) and an output device 108 such as a display device for displaying results of the computation.

As can be appreciated from the above description, the computer readable memory can be configured to store a set of response equations for sand, shale and fluid that are present in the rock formation, wherein the shale includes laminated shale, dispersed shale and structural shale. The computer processor can be configured to determine simultaneously a solution of the set of response equations, wherein the solution includes volume fractions for sand, shale and fluid and a texture of the shale including fractions of laminated shale, dispersed shale and structural shale.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

Furthermore, since numerous modifications and changes will readily occur to those of skill in the art, it is not desired to limit the invention to the exact construction and operation described herein. Accordingly, all suitable modifications and equivalents should be considered as falling within the spirit and scope of the invention.

What is claimed is:

1. A computer implemented method for performing petrophysical analysis for composition and texture of a rock formation, the method comprising:
   inputting, into the computer, a set of log and texture-related response equations for sand, a shale or clay material, and fluid that are present in the rock formation, wherein the shale or clay material comprises laminated material, dispersed material, and structural material and the log and texture-related response equations include equations based on the Thomas-Stieber construction;
   assigning, by the computer, distinct response parameters to the structural material, the dispersed material, and the laminated material;
   determining, by the computer, a solution of the set of log and texture-related response equations simultaneously, the solution describing composition and texture of the rock formation;
   determining, simultaneously by the computer, from the solution composition volume fractions for the sand, the shale or clay material, and the fluid and a texture of the shale or clay material including fractions of the laminated material, the dispersed material and the structural material; and
   outputting the composition volume fractions for the sand, the shale or clay material, and the fluid and the texture of the shale or clay material including fractions of the laminated material, the dispersed material and the structural material to a display.

2. The method according to claim 1, wherein inputting the set of log and texture-related response equations comprises inputting a gamma ray log response equation, thermal neutron log response equation, density log response equation, resistivity log response equation, or any combination of two or more thereof.

3. The method according to claim 1, wherein inputting the set of log and texture-related response equations comprises inputting a maximum porosity, the maximum porosity obtained by reference to results of conventional petrophysical compositional analysis.

4. The method according to claim 3, further comprising reading the maximum porosity from a measurement point or interval substantially free of shale.

5. The method according to claim 3, wherein the maximum porosity is a trend referenced to depth.

6. The method according to claim 3, wherein inputting the set of log and texture-related response equations includes inputting a relationship between the maximum porosity, a laminated shale fraction and a dispersed shale fraction.

7. The method according to claim 1, wherein inputting the set of log and texture-related response equations comprises inputting a sum of a laminated shale fraction, a dispersed shale fraction and a structural shale fraction that are related via an equation computation of total bulk shale fraction.

8. The method according to claim 7, wherein the equation computation of total bulk shale fraction includes a gamma ray index shale fraction equation.

9. The method according to claim 1, wherein determining a solution comprises determining volume fractions of laminated shale, dispersed shale, structural shale, sand, mud filtrate, connate water and hydrocarbon.

10. The method according to claim 1, wherein inputting the set of log and texture-related response equations comprises inputting an equation based on independently derived estimates of a laminated shale fraction, the independently derived estimates being independent from the Thomas-Stieber construction.

11. The method according to claim 10, wherein the independently derived estimates include an analysis of whole core, borehole image logs, or inversion of tri-axial induction logs, or any combination thereof.

12. The method according to claim 10, wherein finite quantities of three shale types including a structural shale, a dispersed shale and a laminated shale or three clay types including a structural clay, a dispersed clay, and a laminated clay, or any permutation or combination thereof coexist.

13. A computer system for performing petrophysical analysis for composition and texture of a rock formation, the computer system comprising:
   a memory configured to store a set of log and texture-related response equations for sand, a shale or clay material, and fluid that are present in the rock formation, wherein the shale or clay material comprises a laminated material, a dispersed material, and a structural material and the log and texture-related response equations include equations based on the Thomas-Stieber construction;

a processor configured to assign distinct response parameters to the structural material, the dispersed material, and the laminated material and determine simultaneously a solution of the set of log and texture-related response equations, the solution describing composition and texture of the rock formation; and a display configured to output the composition and texture of the rock formation, wherein the solution includes compositional volume fractions for the sand, the shale or clay material, and the fluid and a texture of the shale or clay material including fractions of the laminated material, the dispersed material, and the structural material.

14. The computer system according to claim 13, wherein the memory is configured to store measured data logs and response parameters for volume fractions of the sand, the shale or clay material, and the fluid.

15. The computer system according to claim 13, wherein the set of log and texture-related response equations comprises a gamma ray log response equation, thermal neutron log response equation, density log response equation, resistivity log response equation, or any combination of two or more thereof.

16. The computer system according to claim 13, wherein the set of log and texture-related response equations comprises a maximum porosity, the maximum porosity obtained by reference to results of conventional petrophysical compositional analysis.

17. The computer system according to claim 16, wherein the maximum porosity is read from a measurement point or interval substantially free of shale.

18. The computer system according to claim 16, wherein the maximum porosity is a trend referenced to depth.

19. The computer system according to claim 16, wherein the set of log and texture-related response equations includes a relationship between the maximum porosity, a laminated shale fraction and a dispersed shale fraction.

20. The computer system according to claim 13, wherein the set of log and texture-related response equations comprises a sum of a laminated shale fraction, a dispersed shale fraction and a structural shale fraction that are related via an equation computation of total bulk shale fraction.

21. The computer system according to claim 20, wherein the equation computation of total bulk shale fraction includes a gamma ray index shale fraction equation.

22. The computer system according to claim 13, wherein the processor is configured to determine volume fractions of laminated shale, dispersed shale, structural shale, sand, mud filtrate, connate water and hydrocarbon.

23. The computer system according to claim 13, wherein the set of log and texture-related response equations comprises an equation based on independently derived estimates of a laminated shale fraction, the independently derived estimates being independent from the Thomas-Stieber construction.

24. The computer system according to claim 13, wherein the independently derived estimates include an analysis of whole core, borehole image logs, or inversion of tri-axial induction logs, or any combination thereof.

25. The computer system according to claim 23, wherein finite quantities of three shale types including a structural shale, a dispersed shale and a laminated shale or three clay types including a structural clay, a dispersed clay, and a laminated clay, or any permutation or combination thereof coexist.

26. A computer implemented method for analyzing a rock formation, the method comprising:

characterizing, via the computer, a set of log and texture-related response equations representative of a composition and texture of the rock formation, the rock formation comprising a shale or clay material having a texture and the log and texture-related response equations including equations based on the Thomas-Stieber construction, wherein the shale or clay material comprises laminated material, dispersed material, and structural material;

assigning, by the computer, distinct response parameters to the structural material, the dispersed material, and the laminated material;

solving, via the computer, the log and texture-related response equations simultaneously to determine a simultaneous solution of volume fractions for the composition of the rock formation and the texture of the shale or clay material including fractions of the laminated material, the dispersed material, and the structural material in the rock formation; and outputting the volume fractions for the composition of the rock formation and the texture of the shale or clay material including fractions of the laminated material, the dispersed material, and the structural material in the rock formation to a display.

* * * * *